United States Patent [19]

Kozima et al.

[11] 4,091,391

[45] May 23, 1978

[54] DRIVE SYSTEM FOR THERMAL RECORDING APPARATUS

[75] Inventors: Yasuyuki Kozima, Hitachi; Kiyohiko Tanno, Katsuta; Ichiro Ishi, Yokohama, all of Japan

[73] Assignee: Hitachi, Ltd., Japan

[21] Appl. No.: 782,377

[22] Filed: Mar. 29, 1977

[30] Foreign Application Priority Data

Apr. 2, 1976 Japan ................................ 51-35960

[51] Int. Cl.[2] ........................ G01D 15/10; H05B 3/00

[52] U.S. Cl. .................................. 346/76 R; 219/216

[58] Field of Search ....................... 346/76 R; 219/216

[56] References Cited

U.S. PATENT DOCUMENTS 3,984,844 10/1976 Tanno et al. ...................... 346/76 R 4,030,408 6/1977 Miwa ............................ 346/76 R X

*Primary Examiner*—George H. Miller, Jr.

*Attorney, Agent, or Firm*—Craig & Antonelli

[57] ABSTRACT

A plurality of drive leads are taken out of the opposite outer ends of a thermal resistor assembly including a plurality of series-connected thermal resistor elements and junction points between adjacent ones of the thermal resistor elements, thereby dividing the drive leads to alternately belong to a first and a second set of drive leads. The drive leads of the second set of drive leads are further divided to alternately belong to a first and a second group. At least one of the drive leads of the first set of drive leads is selected in accordance with a given pattern and connected to recording signal input means. At the same time, one of the first and second group is selected in accordance with the given pattern, and a common power supply line associated with the selected group is connected to first potential means, a common power supply line associated with the group being connected to second potential means. A recording signal is made to flow through the common power supply line associated with the selected group to actuate the selected resistor element, while the recording signal flowing through the common supply line associated with the other group is suppressed.

10 Claims, 11 Drawing Figures

DRIVE SYSTEM FOR THERMAL RECORDING APPARATUS

FIELD OF THE INVENTION

This invention relates to a drive system for a thermal recording apparatus, comprising a recording head including a plurality of thermal resistor elements, in which a current escaping into thermal resistor elements other than the desired ones is reduced thereby to prevent the color development of the undesired part of the recording paper, or more in particular, to an improvement in the drive system for the thermal recording apparatus disclosed in the U.S. patent application Ser. No. 633,115 entitled "Thermal Recording Apparatus" filed by K. Tanno and Y. Kojima on Nov. 18, 1975 and issued to them as U.S. Pat. No. 3,984,844 on Oct. 5, 1976 and assigned to the same assignee as the present application.

A conventional thermal recording apparatus of this type comprises a thermal head including a plurality of thermal resistors, drive lead electrodes and other accessorial elements on a heat-resistant high-resistance base plate. A pulse voltage in accordance with the information to be recorded is applied to the thermal resistors, thus causing recording current to flow therethrough. The resultant Joule heat generated at the resistors is used to develop color for recording at a predetermined part of the recording paper coated with a material adapted to develop color in response to heat (generally called "the thermal recording paper").

An example of a head recently used for such a recording apparatus includes, for example, a plurality of resistor elements arranged in matrix as disclosed in the specifications of U.S. Pat. Nos. 3,139,026 and 3,161,457. Another example of a head includes a plurality of resistor elements connected in series and drive leads taken out of the junction points between adjacent ones of the resistor elements and divided to belong alternately to first and second sets of drive leads, wherein at least one drive lead of the first set of drive leads and at least one drive lead of the second set of drive leads are selectively supplied with a recording signal in accordance with a given pattern thereby driving at least one desired resistor element, as disclosed in the specification of U.S. Pat. No. 3,984,844 referred to above. In the drive circuit of these apparatuses, in case of connecting drive leads with common lines through which recording current is supplied, as in the other conventional recording heads, diodes are required to prevent current from flowing through thermal resistor elements other than the desired ones via common lines. Since almost as many diodes as thermal resistor elements are required, the head drive ciruit is complicated very much.

SUMMARY OF THE INVENTION

Accordingly, an object of the present invention is to eliminate the above-mentioned disadvantages of the conventional thermal recording apparatuses.

Another object of the present invention is to provide a drive system for the thermal recording apparatus, which is so improved that escape current is prevented with a simple configuration without using diodes.

Still another object of the invention is to provide an improved drive system for the thermal recording apparatus high in responsiveness.

A further object of the invention is to provide an improved drive system for the thermal recording apparatus with small power consumption.

In order to achieve these objects, according to the present invention, there is provided a drive system for the thermal recording apparatus, wherein a predetermined bias potential is applied to the drive leads for the undesired resistor elements so that escape current flowing through resistor elements other than the desired ones adjacent to those on the recording head is suppressed smaller than a predetermined value.

DESCRIPTION OF THE PRIOR ART

Prior to explanation of embodiments of the invention, typical examples of the drive system for the thermal recording apparatus to which the present invention is applicable will be described below.

Typical examples of the drive system for the conventional recording apparatus having a recording head with a plurality of thermal resistor elements in series and drive leads taken out of the junction points between adjacent ones of the resistor elements and divided to belong alternately to first and second sets of drive leads, wherein at least one drive lead of the first set of drive leads and at least one drive lead of the second set of drive leads are selectively supplied with a recording signal in accordance with a given pattern thereby driving at least one desired resistor element, as disclosed in U.S. Pat. No. 3,984,844 supral are shown in FIGS. 1 and 2.

Figure 1:
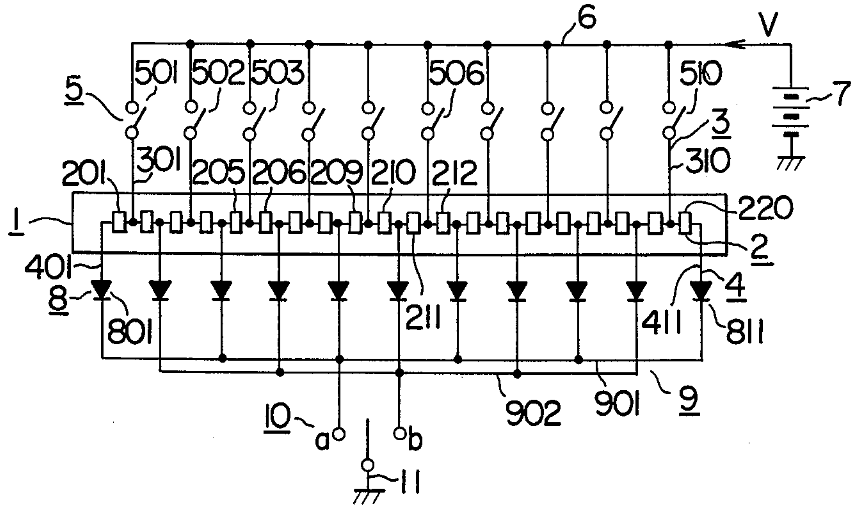
FIGS. 1 and 2 are wiring diagrams showing typical drive systems for conventional thermal recording apparatuses.
Figure 2:
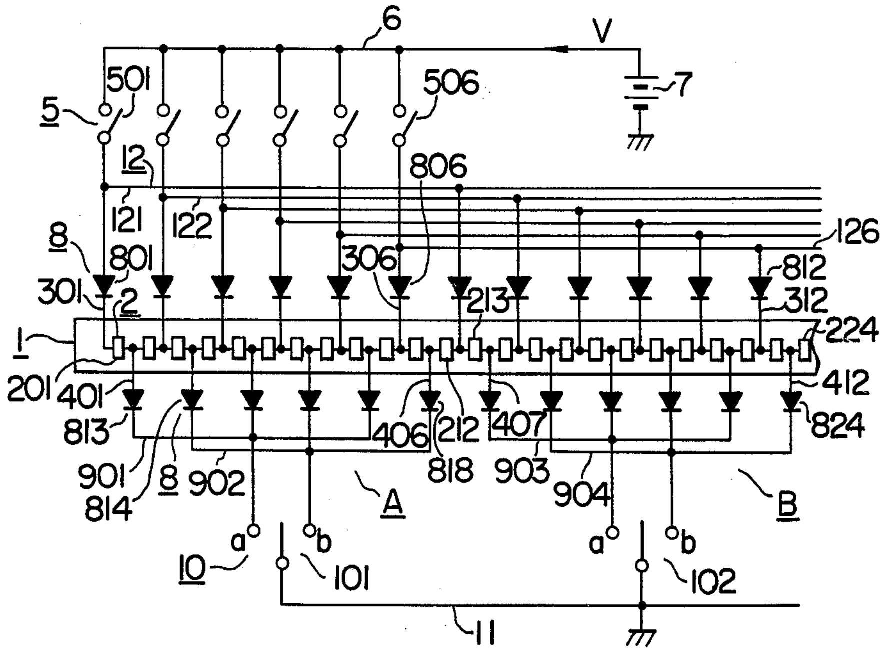

In FIG. 1, reference numeral 1 shows a recording head having a thermal resistor assembly 2 including a plurality of thermal resistor elements 201 to 220 connected in series. A plurality of drive leads are taken out of opposite both sides of the thermal resistor assembly 2 and junction points between adjacent ones of the resistor elements 201 to 220 in opposite directions alternately, thereby making the drive leads 301 to 310 taken out in one direction and the drive leads 401 to 411 taken out in the other direction to belong to a first set of drive leads 3 and a second set of drive leads 4 respectively. Reference numeral 5 shows a signal selector switch group including signal selector switches 501 to 510 respectively connected to the drive leads 301 to 310 of the first set of drive lead 3. The switches 501 to 510 of the signal selector switch group 5 are connected through a power supply line 6 to a power supply 7 of a predetermined recording voltage V. The opening and closing operations of the switches 501 to 510 are controlled according to a predetermined pattern by means of a drive control device not shown in the drawing.

The drive leads 401 to 411 of the second set of drive leads respectively are taken out through associated diodes 801 to 811 and divided to belong alternately to a first and a second group. The drive leads of the first group is connected to a first common line 901, and those of the second group to a second common line 902. The common lines 901 and 902 are connected through a group selector switch 10 to a grounding line 11 by way of corresponding terminals *a* and *b* respectively. The cathodes of the diodes are connected to the respective common lins, while the anodes thereof are connected to the thermal resistor elements.

Figure 3:
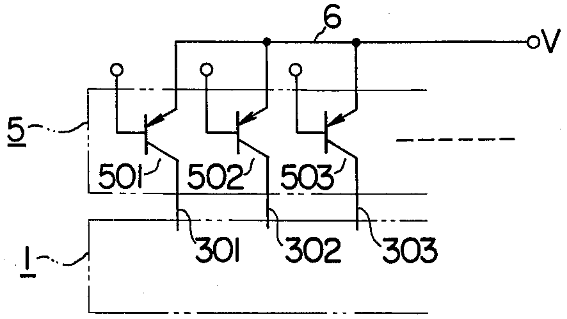
FIG. 3 is a wiring diagram showing an example of a specific circuit including signal selector switch group.

Each of the signal selector switches 501 to 510 comprises for example, a PNP transistor which has an emitter connected to the power supply line 6, a collector connected to an associated one of the first set of drive leads 6, and a base connected to the drive control device as shown in FIG. 3. Each of the transistors may be replaced by a PNP transistor, a thyristor or a field effect transistor.

Figure 4:
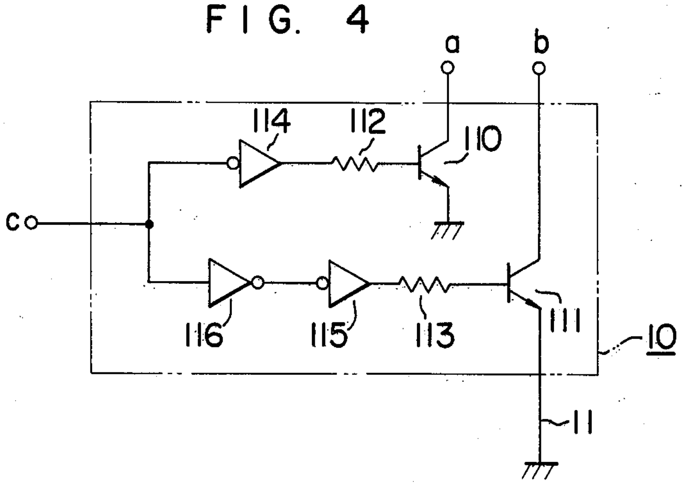
FIG. 4 is a wiring diagram showing group selector switches.

The group selector switch 10 comprises, as shown in FIG. 4, a switch circuit including a couple of NPN transistors 110 and 111, resistors 112 and 113 and inverters 114, 115 and 116. When a low-level control signal is applied to the control signal terminal *c* connected to the drive control device, the transistor 110 is rendered conductive so that the terminal *a*, i.e., the first common line 901 is selected and grounded. Upon application of a high-level control signal to the control signal terminal *c*, on the other hand, the transistor 111 conducts with the result that the terminal *b*, i.e., the second common line 902 is selected and grounded.

In this apparatus, the timings of operation of the group selector switch 10 are synchronized with those of the switches 501 to 510 of the signal selector switch group 5 in accordance with the pattern of the information signal to be recorded, supplied from the drive control device. In this way, two or more recording processes are repeated, thereby making it possible to drive all of the resistor elements 201 to 220.

In this recording head, the thermal resistor assembly 2 is easily matched with the first and second set of drive leads 3 and 4, and it has the advantage that the recording of not only characters or lines but "gang" recording, wherein the entire surface of the recording paper is recorded, are effected easily and accurately. The shortcoming is, however, that because the second set of drive leads 4 are divided into two groups, the inconvenience mentioned below will result in the absence of the diodes 801 to 811. That is, if the switch 503 and the first common line 901 are selected to drive the resistor element 205, for instance, a circuit is formed comprising the resistor element 206, the second common line 902 and the resistor elements 210 and 209 and the grounding line 11. Thus, a large current may flow through undesirable specific resistor elements thereby effecting an unrequired recording, depending on the condition of the recording signal.

To obviate such shortcomings, the diodes 801 to 811 are inserted. In the presence of these diodes, if the switch 503 and the first common line 901 are selected for driving the resistor element 205, a voltage V is directly applied to the resistor element 205 so that Joule heat sufficient to develop color on the recording paper is generated. The voltage V is also applied to the resistors 206 to 208. Since the voltage V is applied across these three resistor elements, only one third of the voltage V is applied to each of them, with the result that heat generated in each of them is only one ninth of that generated in the resistor element 205, so that depending on the property of the recording paper, it does not develop any color. No current flows through the other resistor elements since no voltage is applied to them. It has thus been found that at maximum one third of the voltage V is applied to the resistor elements other than desired ones thereby preventing undesirable color development. In this circuit, however, not only the diodes 8 for preventing escape current are indispensable but the diodes and signal selector switches 5 as many as almost half of the resistor elements 201 to 220 of the recording head are required, thereby greatly complicating the circuits surrounding the recording head. Further the apparatus cost becomes high almost in proportion to the number of the signal selector switches. This apparatus therefore is not practically usable for the line printer or facsimile requiring about 500 to 1000 units of thermal resistor elements, but its application is limited only to a small-size serial printer employing a comparatively small number of resistor elements. Now, the driving time of a resistor element is usually 1 ms – 10 ms and the cooling time thereof is about five times as long as the driving time. Therefore, in the circuit in FIG. 1, much cooling time is required thereby retarding switching operations of resistor elements.

In the case of the line printer or facsimile using a great number of thermal resistor elements, a matrix drive system as shown in FIG. 2 is used in order to reduce the number of the signal selector switches. In FIG. 2, component elements denoted by the same reference numerals as in FIG. 1 show the same elements as in FIG. 1. In the drive system of FIG. 2, the thermal resistor elements are divided into a first thermal resistor element block A including 12 thermal resistor elements 201 to 212 and a second thermal resistor element block B including 12 series-connected thermal resistor elements 213 to 224 in series with the first thermal resistor element block A. The drive leads 301 to 306 taken out of the first thermal resistor element block A are connected to corresponding signal selector switches 501 to 506 respectively through corresponding diodes 801 to 806 with the cathodes thereof connected to the thermal resistor elements. The drive leads 307 to 312 taken out of the second thermal resistor element block B, on the other hand, are respectively connected to corresponding signal selector switches 501 to 506 through diodes 807 to 817 with the cathodes connected to the thermal resistor elements and also through common signal lines 121 to 126. The drive leads of the second set of drive leads which are taken out of the first thermal resistor block A are distributed alternately to a first and a second drive lead group. The drive leads 401, 403 and 405 of the first drive lead group are respectively connected to a first common line 901 through diodes 813, 815 and 817 with the anodes thereof connected to the thermal resistor elements. The drive leads 402, 404 and 406 of the second drive lead group, on the other hand, are respectively connected to a second common line 902 through the diodes 814, 816 and 818. Selected one of the first and second common lines is grounded through a group selected switch 101 in accordance with a given pattern.

The drive leads of the second set of drive leads which are taken out of the second thermal resistor element block B are also similarly distributed alternately to a third and a fourth drive lead group. The drive leads 407, 409 and 411 of the third drive lead group are respectively connected to a third common line 903 through corresponding diodes 819, 821 and 823. The drive leads 408, 410 and 412 of the fourth drive lead group, by contrast, are respectively connected to a fourth common line 904 through corresponding diodes 820, 822 and 824. Selected one of the third and fourth common lines is grounded via the group selector switch 102 in accordance with a predetermined pattern.

By employing this matrix drive system, the number of the signal selector switches 5 may be reduced to almost half of the number of the resistor elements 201 to 212 in the block A. In spite of this, escape current flows into the resistor elements other than the desired ones through the common signal lines 121 to 126 for the first set of drive leads 3 in addition to the escape current through the second set of drive leads 4, so that all the diodes 8 for preventing escape current are required to be connected to each of the drive leads. The result is that the diodes 8 substantially in the same number of the resistor elements 201 to 224 of the recording head are required, thereby complicating the circuit construction. Now, the number of the signal selector switches 5 and the group selector switches 10 is decided by selecting the number of the thermal resistor elements in a thermal resistor element block. In case of dividing the thermal resistor elements in eight blocks and driving the blocks one by one in a predetermined sequence, each of the common power lines associated with the blocks is drived once per 16 times drive of all of the blocks. Thus, the number of the blocks may be properly selected in relation with the recording speed and the cost. As described above, the drive systems of FIGS. 1 and 2 are such that diodes are used to prevent escape current so that no voltage higher than one third of V is applied to those resistor elements other than the desired ones thereby to prevent undesirable color development. In other words, heat sufficient for color development of the recording paper is generated by applying the voltage V only to the desired ones of the resistor elements, while the resistor elements adjacent to the desired ones are applied with the voltage V through at least three resistor elements for generation of heat only one ninth of that generated in the desired elements, thus preventing the color development. No voltage is applied to the remaining resistor elements.

In this case, however, the fact that many diodes are required with each drive lead complicates the circuit.

To eliminate this drawback, such another concept was considered by the inventors of the present application that the diodes are removed and, instead thereof, a voltage as high as two thirds of V is positively applied to the non-selected power supply lines other than selected ones corresponding to the desired resistor elements, thus suppressing the voltage across each of the resistor elements other than the desired ones to one third of V. The technical idea of applying one third and two thirds of a recording voltage to non-selected power lines thereby suppressing undesired color is disclosed in the specification of the Japanese Patent Application Kokai (Laid-Open) No. 1748/75 dated Jan. 9, 1975 entitled "Drive System for Thermal Recording Apparatus" based on the Japanese Patent Application No. 48455/73 filed by Oki Electric Industry Co., Ltd. on May 2, 1973. Independently of Oki Electric's patent, the inventors of the present application developed this concept.

The drive system according to Oki Electric's patent application will be described below.

Figure 6:
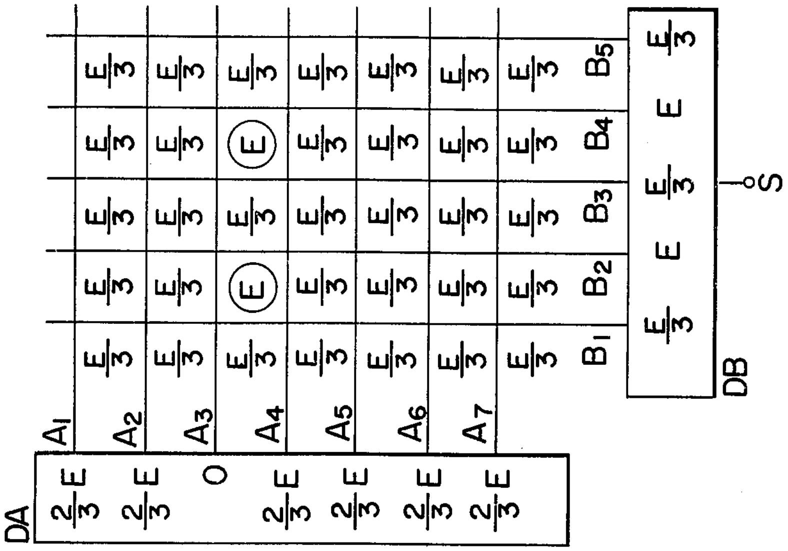
FIG. 6 is a wiring diagram showing a coventional drive system.
Figure 5:
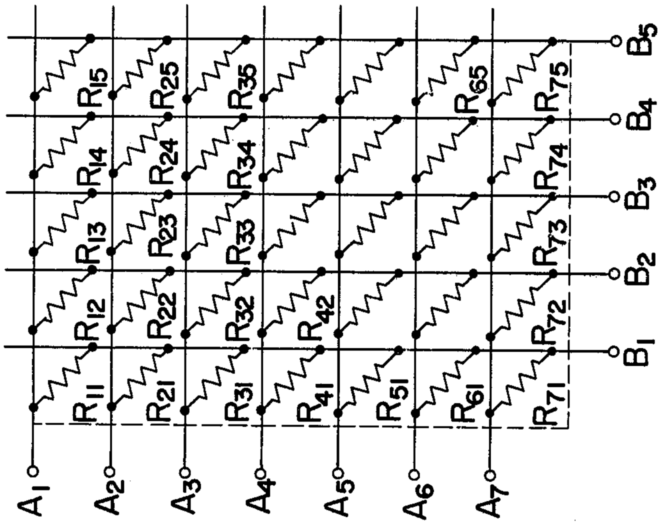
FIG. 5 is a wiring diagram showing a conventional head.

A wiring diagram of the head for the thermal recording apparatus disclosed in the patent specification of Oki Electric is shown in FIG. 5. This is a 7 × 5 thermal printing head including thermal resistor elements arranged and connected in a matrix. In the drawing, $R_{11}$ to $R_{75}$ show thermal resistor elements, $A_1$ to $A_7$ row power supply lines, and $B_1$ to $B_5$ column power supply lines. In FIG. 6, DA shows a drive circuit for setting one of the row power supply lines $A_1$ to $A_7$ at zero volt in a predetermined sequence and for setting the other non-selected row power supply lines at two thirds of E volt. Reference characters DB show a drive circuit for setting each of the column power supply lines $B_1$ to $B_5$ to E volt or one third thereof in accordance with an input character pattern signal S. In the event that, for example, the row power supply line $A_3$ is set at 0 volt and the other non-selected row power supply lines are set at two third of E as shown in FIG. 5 and the column power supply lines $B_2$ and $B_4$ are selectively set at E volts while setting the other column power supply lines at one third of E volts, the voltages as shown are distributed to respective resistor elements.

Joule heat generated under this condition in the resistor elements other than the selected resistor elements $R_{32}$ and $R_{34}$ is one ninth that generated in the latter. In this way, the resistor elements other than the desired ones generate only one ninth of that generated by the desired ones, thereby preventing the color development by the undesired resistor elements.

However, the resistor elements of the head disclosed in the specification of the patent application by Oki Electric Industry Co., Ltd. are arranged in a matrix, so that it was impossible to directly apply the driving method of Oki to the head including series-connected resistor elements and drive leads constructed in such a manner as disclosed in the specification of U.S. Pat. No. 3,984,844 as described above. Further, the drive circuit DA of Oki's drive system requires a plurality of switches for respective rows for change-over between O and two-third of E. In addition, the drive circuit DB thereof requires a plurality of switches for respective columns for change-over between E volts and one third thereof. This leads to the disadvantage that the more resistor elements, the more switches are required, thereby complicating the drive circuits. Another shortcoming is a large power consumption due to application of one third of E volts to all the resistor elements.

DESCRIPTION OF THE PREFERRED EMBODIMENT

The present invention provides a drive system without any of these disadvantages and applicable to a head including a plurality of resistor elements connected in series and drive leads taken out of junction points between adjacent ones of the resistor elements.

In the present invention, in order to reduce the escape current into the resistor elements other than and adjacent to the desired ones on the recording head to below a predetermined level, a predetermined bias potential is applied to the drive leads associated with the undesired resistor elements, thereby simplifying the construction of the recording head.

Figure 7:
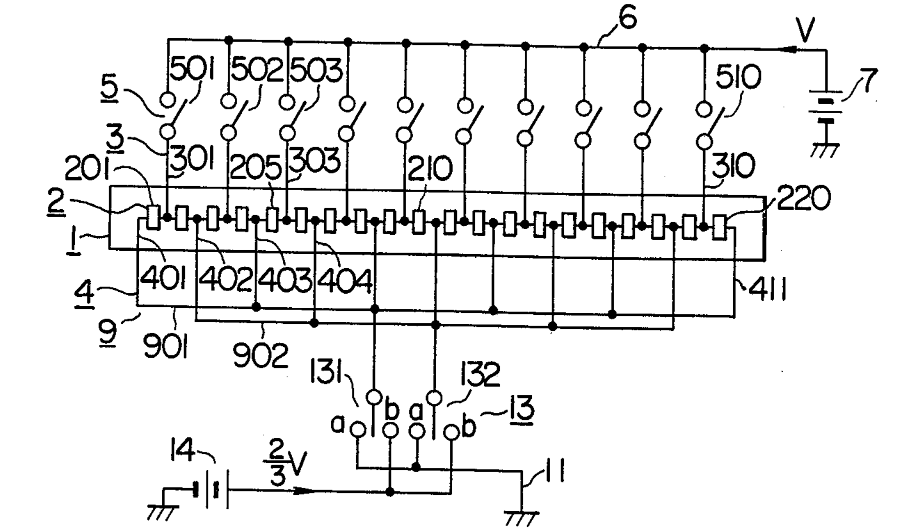
FIG. 7 is a wiring diagram for explaining the principle of the present invention.
Figure 8:
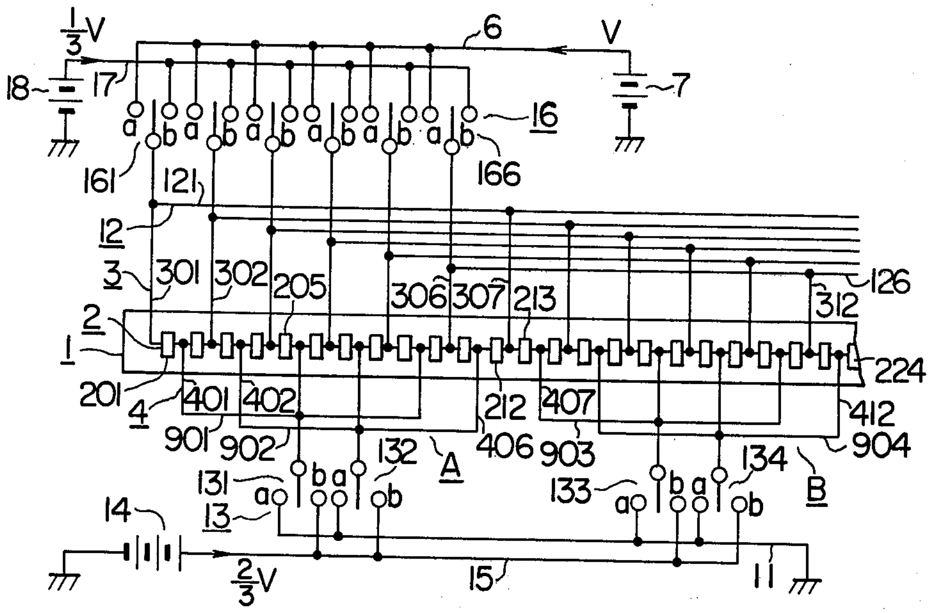
FIG. 8 is a wiring diagram showing an embodiment of the present invention.

The present invention will be described below with reference to the wiring diagram of FIG. 7 and FIG. 8 showing an embodiment of the invention.

Referring first to FIG. 7, in which component elements denoted by the same reference numerals or characters as in FIG. 1 show the same elements as those in FIG. 1 and will not be described again. A thermal resistor assembly 2 on a recording head 1 comprises a plurality of resistor elements 201 to 220 in series. At both sides of the thermal resistor assembly 2 and at junction points between adjacent ones of the resistor elements 201 to 220, drive leads are taken out alternately in opposite directions and they are divided to belong alternately to a first set of drive leads 3 and a second set of drive leads 4.

The drive leads 301 to 310 of the first set of drive leads 3 taken out in one direction are selectively applied with the recording signal voltage V through corresponding switches 501 to 510 of the signal selector switch group 5 respectively.

The drive leads 401 to 411 of the second set of drive leads 4 taken out in the other direction in the recording head, on the other hand, are divided to belong alternately to a first and a second group 9. The common lines 901 and 902 for the respective first and second groups are connected to movable contacts of first and second switches 131 and 132 of a first change-over switch group 13 respectively.

Figure 9:
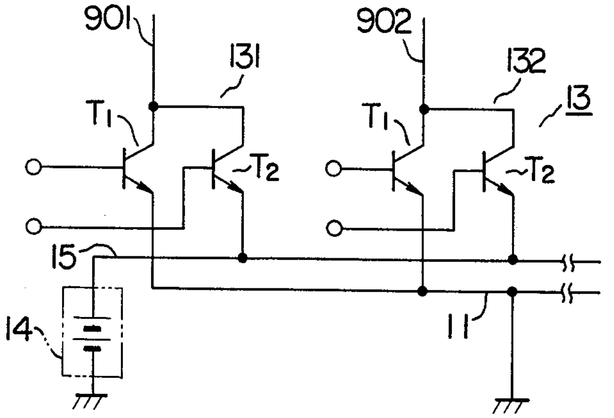
FIG. 9 is a wiring diagram showing a first change-over switch group.

Each of the switches in the first change-over switch group 13 has a first fixed contact *a* connected to the grounding line 11, and a second fixed contact *b* connected to a bias line 15 supplied with power from a bias power supply 14 with the potential of two third of the voltage V of the power supply 7. The first change-over switch group 13 acts as a selector for selecting either the common line 901 or 902 of the groups 9. Each of the switches 131, 132 of the first change-over switch group 13 includes, for example, a couple of NPN transistors $T_1$ and $T_2$ connected in parallel as shown in FIG. 9, in such a manner that the transistor $T_1$ has an emitter connected to the grounding line 11 to make up the first contact *a*, while the emitter of the transistor $T_2$ is connected via the bias line 15 to the bias power supply 14 thereby to make up the second contact *b* and collectors of the transistors $T_1$ and $T_2$ are connected to the associated common line. The switching operation is effected by applying a base signal to the bases of these transistors from drive means not shown in accordance with a predetermined pattern. The transistors $T_1$ and $T_2$ may alternatively take the form of PNP instead of NPN type or may be replaced by field effect transistors or thyristors.

According to the invention with this construction, assume that the resistor elements 201 and 205 of the thermal resistor assembly 2 are driven. The switches 501 and 503 of the signal selector switch group 5 are closed, the first contact *a* of the first switch 131 of the change-over switch group 13 is closed, and also the second contact *b* of the second switch 132 is closed. The common line 901 of the groups 9 is connected to the grounding line 11, while the common line 902 is connected to the bias power supply 14.

The voltage V is applied to the resistor element 201 via the switch 501, and the drive leads 301 and 401 thereby cause a regular driving current to flow through the element 201. Further, a regular driving current flows in the resistor element 205 from the power supply 7 through the switch 503, the drive leads 303 and 403 and the contact *a* of the first change-over switch 131, thereby generating heat of predetermined temperature at the elements 201 and 205. As a result, the corresponding parts of the recording paper are colored.

Although resistor elements 202 and 206 adjacent to the resistors elements 201 and 205 are respectively applied with the voltage V through the drive leads 301 and 303 of the first set of drive leads, they are also applied with the voltage one third of V from the bias power supply 14 through the drive leads 402 and 404 of the second set of drive leads respectively. Therefore, only one third of voltage V is applied to each of the elements 202, 206. As to the remaining resistor elements, the drive current from the bias power supply 14 flows in the drive lead of the first group of the second set of drive leads 4 through the drive leads of the second set of drive leads 4 and a couple of resistor elements in series, so that a voltage only one third of V is applied to each of the remaining resistor elements. The result is that power consumption by these undesired resistor elements is one ninth of that by the desired ones, with the result that no color is developed by the undesired resistor elements, thereby preventing undesired recording.

In this way, the diodes for preventing escape current is eliminated, thereby simplifying the circuit construction, unlike the conventional apparatus shown in FIG. 1.

The wiring diagram of another embodiment of the present invention is shown in FIG. 8. In this drawing, component elements denoted by the same reference numerals as in FIGS. 1 to 7 are the same elements as those in the FIGS. and they will not be described in detail. A thermal resistor assembly 2 including a plurality of series-connected resistor elements 201 to 224 is provided on the recording head 1. At both sides of the thermal resistor assembly 2 and junction points between adjacent ones of the resistor elements 201 to 224, drive leads are taken out alternately in opposite directions to belong alternately to a first set of drive leads 3 and a second set of drive leads 4.

The resistor elements of the second set of drive leads 4 are divided into two blocks A and B including the resistor elements 201 to 212 and 213 to 224 respectively. The drive leads 301 to 306 of the first set of drive leads 3 belonging to the block A are connected to the second change-over switches 161 to 166 respectively, while the drive leads 307 to 312 belonging to the block B of the first set of drive leads 3 are connected commonly to the second change-over switches 161 to 166 through corresponding signal lines 121 to 126 respectively.

Each of the switches 161 to 166 of the second change-over switch group has a couple of fixed contacts *a* and *b*. Each of the first contacts *a* is connected through a power supply line 6 to a power supply 7, while each of the second contacts *b* is connected through a second bias line 17 to a second bias line 17 to a second bias power supply 18 with the potential one third of V, i.e., the potential of the power supply 7.

Further, the drive leads 401 to 406 belonging to the block A of the second set of drive leads 4 taken out in the other direction in the recording head are divided to belong alternately to a first and a second group. The drive leads 401, 403 and 405 of the first group are connected to the common line 901, and the drive leads 402, 404 and 406 of the second group to the second common line 902. The drive leads 407 to 412 belonging to the block B are also divided to belong alternately to a third and a fourth group including the drive leads 407, 409 and 411 and drive leads 408, 410 and 412 which are connected to the third common line 903 and the fourth common line 904 respectively. The common lines 901 to 904 are connected through the change-over switches 131 to 134 switchably alternatively between the first bias line 15 and the grounding line 11.

Figure 10:
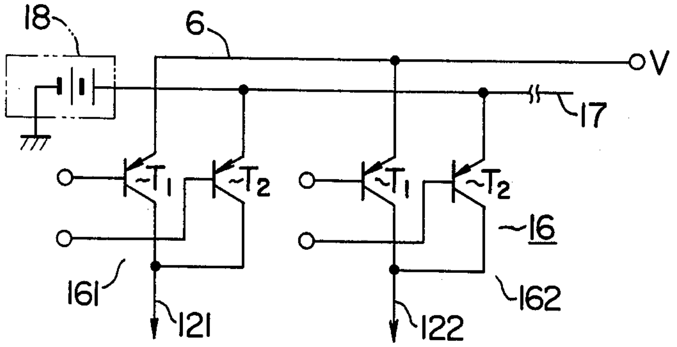
FIG. 10 is a wiring diagram showing a second change-over switch group.

Each of the switches 161 to 166 of the second change-over switch group 16 includes, as shown in FIG. 10, first and second transistors $T_1$ and $T_2$ connected in parallel. The collectors of these transistors are connected to associated one of drive leads of the first set of drive leads 3; the emitter of the first transistor $T_1$ is connected to the power supply line 6; and the emitter of the second transistor $T_2$ is connected to the second bias line 17. A base signal in accordance with a given pattern supplied from the drive means not shown is applied selectively to the base of each of the transistors for switching control. The transistors $T_1$ and $T_2$ may take the form of NPN instead of PNP type or may be replaced by field effect transistors or thyristors.

In the present invention with the above-mentioned construction, assume that the switch 131 of the first change-over switch group 13 is closed at the first contact *a* and the other switches 132 to 134 at the second contact *b*, and that the switches 161 and 163 of the second change-over switch group 16 are closed at the first contact *a* and the other switches thereof at the second contact *b*. The resistor elements 201 and 205 of the block A are selected so that the voltage V is applied to them, thus developing color on the corresponding parts of the recording paper. The voltage V is applied to non-selected resistor elements adjacent to the selected resistor elements such as the resistor element 204 adjacent to the resistor element 205 through the drive lead 303. To the resistor element 204 is also applied a voltage two thirds of V from the bias power supply 14 through the drive lead 402. As a result, the voltage across the resistor element 204 becomes one third of V. The other resistor elements are impressed with one third of V through the drive leads of the first set of drive leads and two thirds of V through the drive leads of the second set of drive leads, with the result that these resistor elements are impressed with one third of V.

With the application of total voltage V, therefore, the resistor elements other than the elements 201 and 205 generate heat as much as one ninth of the heat of the resistor elements 201 and 205, thus preventing undesirable recording.

The foregoing description concerns the resistor elements of the block A selected illustratively, but the resistor element of the block B may be selected and, if necessary, the blocks A and B may also be used at the same time.

Unlike the conventional apparatus shown in FIG. 2, the apparatus according to this embodiment requires no diodes for blocking escape current, thus simplifying the circuit configuration. Further, since the resistor elements of the recording head 1 are always kept preheated, the apparatus according to this embodiment has a high response speed to an input signal, leading to a high speed operation.

Furthermore, as compared with the embodiment of FIG. 7, the number of the switches 16 may be reduced, thereby making it possible to simplify the circuit and reduce the cost of the apparatus.

Figure 11:
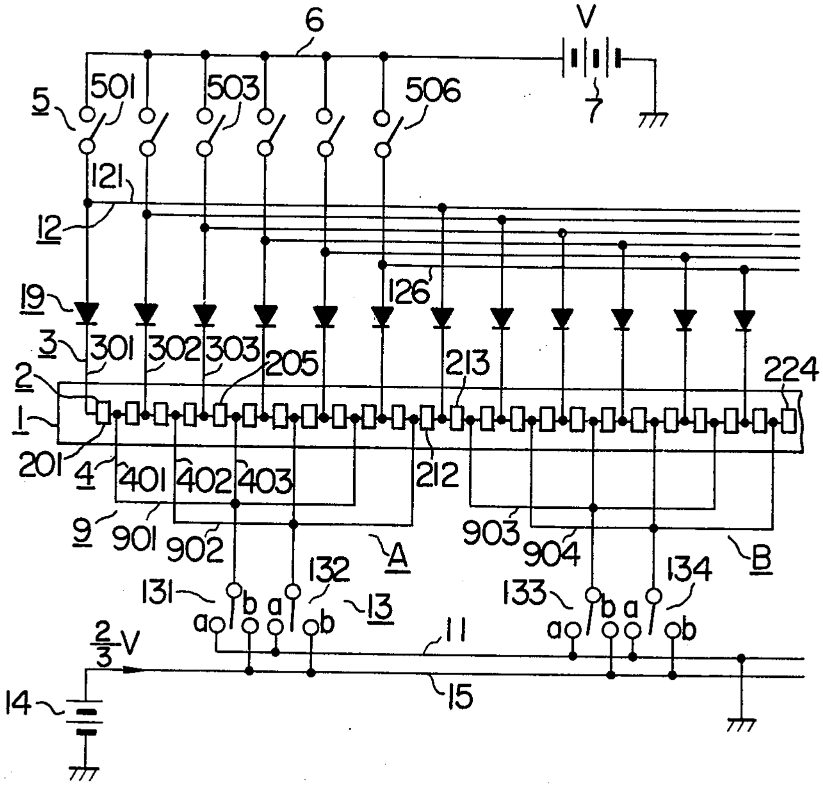
FIG. 11 is a wiring diagram showing another embodiment of the invention.

Still another embodiment is shown in FIG. 11. The resistor elements of the thermal resistor assembly 2 of the recording head 1 are connected in series. Drive leads are taken out of the opposite outer ends of the resistor assembly and the junction points between adjacent ones of the thermal resistor elements to thereby dividing them to belong alternately to a first and a second set of drive leads 3 and 4. Each of the drive leads of the first set of drive leads 3 are taken out through a diode 19, cathode of which is connected to the resistor element. The drive leads of the second set of drive leads 4 are, like the embodiment of FIG. 8, are divided into blocks A and B. Every other drive lead of the second set of drive leads group in the respective blocks is connected to each other through the first to fourth common lines 901 to 904.

The common lines in the blocks are connected switchably through the change-over switches 13 to the first bias line 15 and the grounding line 11.

Further, the change-over switches 13 are controllable for each block.

According to the invention with this circuit configuration, assume that the first block A is selected to drive the resistor elements 201 and 205. The switches 501 and 503 of the signal selector switches 5 are closed. The first switch 131 of the first change-over switch group 13 is closed at the first contact *a*, and the second switch 132 at the second contact *b*, while the change-over switches 133 and 134 of the other block B are opened. In other words, the transistor $T_1$ of the first switch 131 and the transistor $T_2$ of the second switch 132 are turned on in FIG. 9. Further, the transistor $T_2$ of the first switch 131 and $T_1$ of the switch 132 and the transistors $T_1$ and $T_2$ of each of the switches 133 and 134 of the second block B are turned off.

As a consequence, the total voltage V is applied only to the desired resistors 201 and 205 of the first block A, thereby developing color on the recording paper. The non-selected resistor elements adjacent to the selected resistor elements such as the resistor element 205 adjacent to the resistor element 204 is impressed with the voltage V through the drive lead 303 and at the same time with a voltage two thirds of V from the bias power supply 14 through the drive lead 402. A voltage one third of V is therefore generated across the resistor element 204. A voltage one third of the voltage V is generated across each of other resistor elements such as 202 and 203 of the first block A since the drive current from the bias power supply 14 flows through the drive lead 402, the two resistor elements 202 and 203 and the drive lead 401. No voltage is applied to each resistor element of the second block B.

Control operation for each block is thus possible, so that power consumption in other than the desired blocks is saved, thus contributing to overall reduction in power consumption. Although additional diodes are required in the embodiment under consideration as compared with the embodiment of FIG. 9, the simplified construction of the switches 5 reduces the cost of the apparatus.

By way of explanation, the polarity of voltages, the number of the resistor elements included in the thermal resistor assembly, the number of matrix units or the number of blocks may of course be properly selected as desired.

We claim:

1. A drive system for a thermal recording apparatus, comprising:

recording signal input means;

a thermal resistor assembly including a plurality of thermal resistor elements connected in series;

a plurality of drive leads taken out of the opposite outer ends of said thermal resistor assembly and a plurality of junction points between adjacent ones of said thermal resistor elements, said plurality of drive leads being divided to belong alternately to a first and a second set of drive leads, said drive leads of said second set of drive leads being divided to belong alternately to a first and a second group;

first connector means for selectively connecting at least one of said drive leads of said first set of drive leads to said recording signal input means in accordance with a given pattern;

first potential means;

second potential means;

a first common power supply line connected to each of said drive leads of said first group;

a second common power supply line connected to each of said drive leads of said second group; and second connector means for selecting one of said first and second groups in accordance with a given pattern, said second connector means connecting one of said first and second common power supply lines associated with said selected one of said first and second groups to said first potential means, said second connector means connecting the other of said first and second common power supply lines associated with the other of said first and second blocks to said second potential means, whereby said one of said first and second common power supply lines is supplied with a recording signal thereby to actuate operatively at least one of said resistor elements selected in accordance with said predetermined pattern, and the recording signal flowing through said other of said first and second common power supply lines is suppressed.

2. A drive system for a thermal recording apparatus according to claim 1, in which said second connector means includes a first transistor with the emitter-collector circuit thereof connected between said first common power supply line and said first potential means, a second transistor with the emitter-collector circuit thereof connected between said first common power supply line and said second potential means, a third transistor with the emitter-collector circuit thereof connected between said second common power supply line and said first potential means, and a fourth transistor with the emitter-collector circuit thereof connected between said second common power supply line and said second potential means, each of said first, second, third and fourth transistors having a base controlled in accordance with said given pattern.

3. A drive system for thermal recording apparatus according to claim 1, in which the output voltage of said first potential means is zero, and the output voltage of said second potential means is two thirds of the voltage of said recording signal.

4. A drive system for a thermal recording apparatus, comprising:

N thermal resistor assemblies each including M thermal resistor elements connected in series, said N thermal resistor assemblies being connected in series;

a plurality of drive leads taken out of the opposite outer ends of said series-connected N thermal resistor assemblies and junction points between adjacent ones of said thermal resistor elements of said thermal resistor assemblies, said plurality of drive leads being divided to belong alternately to a first and a second set of drive leads, the drive leads of said second set of drive leads taken out of each of said N thermal resistor assemblies being divided to belong alternately to a first and a second group;

first, second and third potential means;

a first switching means including a plurality of first switching elements respectively connected to corresponding ones of the drive leads of said first set of drive leads which are taken out of one of said N thermal resistor assemblies, said first switching elements being also respectively connected to corresponding ones of the drive leads of said first set of drive leads which are taken out of each of the remaining of said N thermal resistor assemblies, said first switching element group being adapted to operate in such a manner that at least one of the drive leads of said first set of drive leads which are taken out of said one of said N thermal resistor assemblies and at least one of the drive leads of said first set of drive leads, associated with said at least one of the drive leads of said first set of drive leads taken out of said one of said N thermal resistor assemblies, which are taken out of each of said remaining of said N thermal resistor assemblies are selectively connected to said recording signal input means in accordance with a given pattern, and that the remaining of the drive leads of said first set of drive leads being connected to said second potential means, thereby rendering a recording signal to flow through said selected drive leads of said first set of drive leads and suppressing a recording signal flowing through said remaining of said first set of drive leads;

N first common power supply lines respectively associated with said N first groups, each of said first common power supply lines connected to said drive leads of associated one of said first groups;

N second common power supply lines respectively associated with said N second groups, each of said second common power supply lines connected to said drive leads of associated one of said second groups; and second switching means for selecting at least one of said first and second groups in accordance with said given pattern, said second switching means being operable in such a manner that the power supply line associated with said selected at least one group is connected to said first potential means thereby to operatively actuate at least one of said resistor elements selected in accordance with said given pattern, and that the power supply lines associated with other groups being connected to said third potential means thereby to suppress the recording signal flowing through said power supply lines associated with said other groups, and that said first and second groups associated with each of said N thermal resistor assemblies being prevented from being connected tosaid first potential means simultaneously.

5. A drive system for a thermal recording apparatus according to claim 4, in which each of said first switching elements of said first switching means includes a first transistor with the emitter-collector circuit thereof connected between said recording signal input means and a corresponding one of the drive leads of said first set of drive leads, and a second transistor with the emitter-collector circuit thereof connected between said second potential means and said corresponding one of said drive leads, each of said first and second transistors having the base controlled in accordance with said given pattern.

6. A drive system for a thermal recording apparatus according to claim 4, in which said second switching means includes N second switching elements respectively associated with said N thermal resistor assemblies, each of said second switching elements having a first transistor with the emitter-collector circuit thereof connected between corresponding one of said first common power supply lines and said first potential means, a second transistor with the emitter-collector circuit thereof connected between said corresponding one of said first common power supply lines and said second potential means, a third transistor with the emitter-collector circuit thereof connected between corresponding one of said second common power supply lines and said first potential means, a fourth transistor with the emitter-collector circuit thereof connected between said corresponding one of said second common power supply lines and said second potential means, each of said first, second, third and fourth transistors having the base controlled in accordance with said given pattern.

7. A drive system for a thermal recording apparatus according to claim 4, in which the output voltage of said first potential means is zero, the output voltage of said second potential means is one third of the voltage of said recording signal, and the output voltage of said third potential means is two thirds of the voltage of said recording signal.

8. A drive system for a thermal recording apparauts, comprising:

recording signal input means;

N thermal resistor assemblies each including M thermal resistor elements connected in series, said N thermal resistor assemblies connected in series;

a plurality of drive leads taken out of opposite outer ends of said series-connected N thermal resistor assemblies and junction points between adjacent ones of said thermal resistor elements of said N thermal resistor assemblies, said plurality of drive leads being divided to belong alternately to a first and a second set of drive leads, each of the drive leads of said first set of drive leads being taken out through a diode, the drive leads of said second set of drive leads taken out of each of said N thermal resistor assemblies being divided to belong alternately to a first and a second group;

a first switching means including a plurality of first switching elements respectively connected to the corresponding ones of said drive leads of said first set of drive leads which are taken out of one of said N thermal resistor assemblies, said first switching elements being further connected to corresponding ones of the drive leads of said first set of drive leads taken out of each of the remaining of said H thermal resistor assemblies, said first switching means being operable in such a manner that at least one of the drive leads of said first set of drive leads which are taken out of said one of said N thermal resistor assemblies and at least one of the drive leads of said first set of drive leads, associated with said at least one of the drive leads of said first set of drive leads taken out of said one of said N thermal resistor assemblies, which are taken out of each of said remaining of said N thermal resistor assemblies are selectively connected to said recording signal input means in accordance with a given pattern;

first and second potential means;

N first common power supply lines respectively associated with said N first groups, each of said first common power supply lines connected to said drive leads of associated one of said first groups;

N second common power supply lines respectively associated with said N second groups, each of said second common power lines connected to said drive leads of associated one of said second groups; and second switching means for selecting at least one of said first and second groups in accordance with said given pattern, said second switching means being operable in such a manner that the power supply line associated with said selected at least one group is connected to said first potential means thereby operatively actuating at least one of said resistor elements selected in accordance with said given pattern, and that the power supply line associated with the other group related to said thermal resistor member associated with said selected at least one group connected to said second potential means thereby suppressing the recording signal flowing through said power supply line associated with the other group, and that the power supply lines associated with the remaining groups being opened thereby to prevent said recording signal from flowing therethrough.

9. A drive system for a thermal recording apparatus according to claim 8, in which said second switching means includes N second switching elements respectively associated with said N thermal resistor assemblies, each of said second switching elements includes a first transistor with the emitter-collector circuit thereof connected between corresponding one of said first common power supply lines and said first potential means, a second transistor with the emitter-collector circuit thereof connected between said corresponding one of said first common power supply lines and said second potential means, a third transistor with the emitter-collector circuit thereof connected between corresponding one of said second common power supply lines and said first potential means, a fourth transistor with the emitter-collector circuit thereof connected between said corresponding one of said second common power supply lines and said second potential means, each of said first, second, third and fourth transistors having the base controlled in accordance with said given pattern.

10. A drive system for a thermal recording apparatus according to claim 8, in which the output voltage of said first potential means is zero, and the output of said second potential means is two thirds of the voltage of said recording signal.

* * * * *